United States Patent Office 3,528,970
Patented Sept. 15, 1970

3,528,970
AMINOMETHYL DERIVATIVES OF 9-CYCLO-PROPYLMETHYLIDENE XANTHENES AND THIOXANTHENES
Carl Kaiser, Haddon Heights, N.J., and Charles L. Zirkle, Berwyn, Pa., assignors to Smith Kline & French Laboratories, Philadelphia, Pa., a corporation of Pennsylvania
No Drawing. Filed Mar. 25, 1968, Ser. No. 715,508
Int. Cl. C07d 7/42, 65/16
U.S. Cl. 260—240
9 Claims

ABSTRACT OF THE DISCLOSURE

Aminomethyl derivatives of 9-cyclopropylmethylidene xanthenes and thioxanthenes wherein the amino group may be primary, secondary or tertiary, including heterocyclic amines, and the xanthene or thioxanthene nucleus may be substituted by chlorine, trifluoromethyl, methoxy or methylmercapto have tranquilizing and antidepressant activity. The compounds are generally prepared from 9-(2-carboxycyclopropylmethylidene)-xanthenes or thioxanthenes via formation of corresponding carboxamido derivatives followed by reduction.

---

This invention relates to noval aminomethyl derivatives of 9-cyclopropylmethylidene xanthenes and thioxanthenes having useful pharmacodynamic activity. More specifically the compounds of this invention have tranquilizing and antidepressant activity as demonstrated in standard animal pharmacological test procedures. Exemplary of the activity shown by the compounds of this invention is the decrease in motor activity, hypotonia, miosis and toe walking produced in rats at oral dosages of 200 mg./kg.

The compounds of this invention are represented by the following general structural formula:

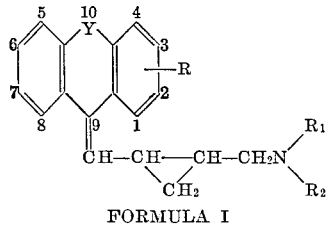

FORMULA I in which:

Y represents oxygen or sulfur, preferably sulfur;
R represents hydrogen, chlorine, trifluoromethyl, methoxy or methylmercapto, preferably in the 2-position; and
$R_1$ and $R_2$ each represent hydrogen, lower alkyl of from 1 to 3 carbon atoms or, when taken together with the nitrogen atom to which they are attached, represent a pyrrolidine, piperidine, N'-methylpiperazine, N'-(β-hydroxyethyl)-piperazine or N'-(β-acetoxyethyl)-piperazine ring.

The compounds of this invention may be used in the form of a pharmaceutically acceptable acid addition salt having the utility of the free base. Such salts, prepared by methods well known to the art, are formed with both inorganic or organic acids, for example: maleic, fumaric, oxalic, benzoic, ascorbic, pamoic, succinic, bismethylene-salicyclic, methanesulfonic, ethanedisulfonic, acetic, propionic, tartaric, salicylic, citric, gluconic, lactic, malic, mandelic, cinnamic, citraconic, aspartic, stearic, palmitic, itaconic, glycolic, p-aminobenzoic, glutamic, benzenesulfonic, hydrochloric, hydrobromic, sulfuric, sulfamic, phosphoric and nitric acids.

The compounds of this invention may be present as cis-trans isomers due to the geometrical arrangement of the xanthene or thioxanthene ring and the aminomethyl moiety with respect to the cyclopropane ring and further as d,l-optical isomers. In addition, when R in Formula I above is not hydrogen, geometrical isomers are possible about the 9-ylidene double bond. Unless otherwise specified in the description and accompanying claims, it is intended to include all isomers, whether separated or mixtures thereof. Where desired the isomers may be separated by standard organic chemical techniques based on differences in physical properties.

In general the novel aminomethyl cyclopropylmethylidene derivatives of this invention are prepared from xanthene or thioxanthene cyclopropylmethylidene carboxylic acids. These useful starting materials having the formula:

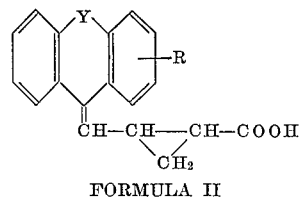

FORMULA II in which Y and R are as defined above in Formula I, are prepared by reacting of corresponding 9-(2-propenylidene)-xanthenes or thioxanthenes with ethyl diazoacetate. The 9-(2-propenylidene) derivatives are conveniently prepared either via Hofmann degradation of corresponding 9-(3-dimethylaminopropylidene)-xanthene or thioxanthene methiodides (the free bases obtained as described in U.S. Pat. Nos. 3,116,291; 3,248,291; 3,244,588 and 3,192,204) or by reacting a 9-xanthone or 9-thioxanthone with an allyl magnesium halide and dehydrating the formed 9-hydroxy-9-allyl derivatives as described in U.S. Pat. No. 3,116,291.

The cyclopropylmethylidene carboxylic acids of Formula II above are converted to aminomethyl compounds of this invention by reaction with a lower alkyl haloformate, preferably ethyl chloroformate, in the presence of a tertiary amine such as triethyl amine to give the corresponding cyclopropylmethylidene mixed anhydride which is then treated with ammonia, a monoalkylamine, a dialkylamine or a heterocyclic amine to give the carboxamide derivative of Formula III:

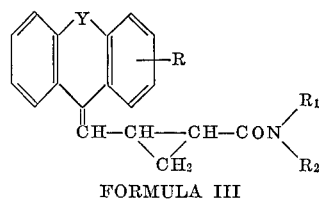

FORMULA III in which Y and R are as defined above in Formula I and $R_1$ and $R_2$ are hydrogen, lower alkyl of from 1 to 3 carbon atoms or together represent a pyrrolidine, piperidine, N'-methylpiperazine or N'-(β-hydroxyethyl)-piperazine ring.

Reduction of the above amide with for example lithium aluminum hydride gives the aminomethyl product. Alternatively the carboxylic acid may be converted to the acid halide, for example the acid chloride with thionyl chloride, and then treated with a secondary amine to give the corresponding amide which is reduced to the aminomethyl product.

The compounds of this invention may be administered orally or parenterally in conventional dosage unit forms such as tablets, capsules, injectables or the like, by incorporating the appropriate dose of a compound of Formula I with carriers according to accepted pharmaceutical practices.

The foregoing is a general description of how to prepare the compounds of this invention. The following examples illustrate the preparation of specific compounds having tranquilizing and antidepressant activity. However this should not be construed as limiting the scope of the invention since appropriate variations in the starting materials will produce other corresponding products set forth hereinabove.

PREPARATION OF CYCLOPROPYLMETHYLIDENE CARBOXYLIC ACIDS OF FORMULA II (A) A solution of 35.0 g. (0.1 m.) of trans-9-(3-dimethylaminopropylidene) - 2-trifluoromethylthioxanthene (U.S. Pat. No. 3,192,204) in 200 ml. of acetone is treated with 20 ml. of methyl iodide. Upon cooling and addition of ether, the methiodide salt is collected, M.P. 216–217° C. About 200 g. of anion exchange resin, Rexyn RG–1 (OH) is washed several times with methanol, suspended in 400 ml. of methanol and the above methiodide is added. The mixture is stirred at room temperature for one hour, filtered and the filtrate concentrated in vacuo on a steam bath. The residue is washed several times with dry toluene and recrystallized from a small volume of petroleum ether to yield 9-(2-propenylidene) - 2-trifluoromethylthioxanthene, M.P. 86–88° C.

(B) To a stirred and refluxing mixture of 6.1 g. (0.02 m.) of 9-(2-propenylidene) - 2-trifluoromethylthioxanthene (prepared as described above) and 0.5 g. of anhydrous copper sulfate powder in 50 ml. of toluene is added dropwise (about 10–15 minutes) 2.3 g. (0.02 m.) of ethyl diazoacetate. An additional 2.3 g. of ethyl diazoacetate is added and this is repeated (2 more times) until vapor phase chromatography indicates substantially all product formation. The reaction mixture is filtered, the filtrate is concentrated in vacuo and the residue distilled to give 9-(2-carbethoxycyclopropylmethylidene) - 2 - trifluoromethylthioxanthene, B.P. 195–205° C./0.5 mm.

To a solution of 5.2 g. (0.0135 m.) of 9-(2-carbethoxycyclopropylmethylidene) - 2-trifluoromethylthioxanthene in 50 ml. of ethanol is added a solution of 2.3 g. (0.04 m.) of potassium hydroxide in 10 ml. of water. The mixture is stirred and refluxed for one hour, then concentrated and diluted with water. The resulting mixture is extracted with ether and the aqueous layer is acidified with dilute hydrochloric acid. The acid solution is extracted with ether and the dried ether extract is concentrated. The residue is triturated with hexane to give 9-(2-carboxycyclopropylmethylidene) - 2 - trifluoromethylthioxanthene, M.P. 203–207° C. The filtrate from the trituration is concentrated in vacuo to give an isomeric acid, M.P. 238–241° C.

(C) By employing in part B above the following 9-(2-propenylidene)-thioxanthenes and xanthenes (see U.S. Pat. No. 3,116,291), there is obtained corresponding 9-(2-carboxycyclopropylmethylidene) starting materials:

9-(2-propenylidene)-2-chlorothioxanthene
9-(2-propenylidine)-thioxanthene
9-(2-propenylidene)-2-methylmercaptothioxanthene
9-(2-propenylidene)-2-methoxythioxanthene
9-(2-propenylidene)-2-methoxyxanthene
9-(2-propenylidene)-2-chloroxanthene.

EXAMPLE 1

A mixture of 3.6 g. of 9-(2-carboxycyclopropylmethylidene) - 2-trifluoromethylthioxanthene (M.P. 203–207° C.) in 50 ml. of acetone is stirred in ice and 1.61 g. of triethylamine is added slowly. After about five minutes a solution of 1.78 g. of ethyl chloroformate in 10 ml. of acetone is added dropwise. The resulting mixture is stirred at 0° C. for about 20 minutes, then 10 ml. of 40% aqueous dimethylamine is added dropwise. Stirring is continued at room temperature for 30 minutes and at 50° C. for 30 minutes. The reaction mixture is poured into methylene chloride/ice water and the aqueous layer is extracted with ether. The combined organic solution is dried and evaporated in vacuo to leave 9-[2-(N,N-dimethylcarboxamido)-cyclopropylmethylidene] - 2 - trifluoromethylthioxanthene.

To 2.0 g. of lithium aluminum hydride in 200 ml. of dry ether is added slowly a solution of 3.8 g. of the above amide in dry ether and the mixture is stirred and refluxed for three hours. The reaction mixture is decomposed, filtered and the filtrate extracted with dilute hydrochloric acid. The aqueous solution is washed with ether, made basic with dilute sodium hydroxide solution and extracted with ether. The washed and dried ether extract is evaported in vacuo to yield 9-[2-(N,N-dimethylaminomethyl)-cyclopropylmethylidene] - 2 - trifluoromethylthioxanthene, oxalate M.P. 194–197° C.

Similarly, by employing pyrrolidine instead of dimethylamine in the above reaction sequence with subsequent reduction by lithium aluminum hydride there is obtained 9 - [2-(N-pyrrolidinylmethyl)-cyclopropylmethylidene]-2-trifluoromethylthioxanthene.

EXAMPLE 2

To a mixture of 3.7 g. of 9-(2-carboxycyclopropylmethylidene)-2-chlorothioxanthene and 3 ml. of triethylamine, cooled to 0° C., is added 2 ml. of ethyl chloroformate in acetone. The mixture is stirred for 15 minutes and then 4.4 g. of N-(β-hydroxyethyl)-piperazine in acetone is added with cooling. After stirring for three hours at room temperature, the reaction mixture is poured into cold water and extracted with ether. The dried extract is evaporated to give N-(β-hydroxyethyl)-N'-<2-[9-(2 - chlorothioxanthenyl) - methylidene]-cyclopropanoyl>-piperazine.

To a suspension of 1.09 g. of lithium aluminum hydride in ether is added a suspension of 3.7 g. of the above piperazine derivative in ether and the mixture stirred and refluxed for eight hours. Usual workup of the reaction mixture yields 2-[9 - (2 - chlorothioxanthenyl)-methylidene] - N-[N'-(β-hydroxyethyl)]-piperazinylmethylcyclopropane. Acetylation with acetyl chloride yields the corresponding β-acetoxyethyl derivative.

Similarly, by employing N-methylpiperazine in the above reaction sequence the corresponding N-methyl-N'-<2-[9 - (2-chlorothioxanthenyl)-methylidene]-cyclopropanoyl>piperazine is obtained which is reduced with lithium aluminum hydride to give 2-[9-(2-chlorothioxanthenyl)-methylidene] - N-(N'-methyl) - piperazinylmethylcyclopropane.

EXAMPLE 3

A solution of 7.5 g. of 9-(2-carboxycyclopropylmethylidene)-thioxanthene in 75 ml. of acetone is treated with 7 ml. of triethylamine in acetone, cooled, below 0° C. and 5 ml. of ethyl chloroformate in acetone is added. After stirring for 30 minutes, a solution of 11.5 g. of dimethylamine in 30 ml. of acetone is added and the mixture stirred for three hours. Workup of the reaction mixture yields 9-[2-(N,N-dimethylcarboxamido)-cyclopropylmethylidene]-thioxanthene.

The above amide (10.2 g.) in ether solution is reduced with 2.7 g. of lithium aluminum hydride to give 9 - [2-(N,N-dimethylaminomethyl) - cyclopropylmethylidene]-thioxanthene.

Similarly by employing 8.6 g. of 9-(2-carboxycyclopropylmethylidene) - 2 - methylmercaptothioxanthene in the above reaction sequence there is obtained as the final product 9-[2 - (N,N-dimethylaminomethyl)-cyclopropylmethylidene]-2-methylmercaptothioxanthene.

EXAMPLE 4

Following the procedures of Example 1, 2 or 3, 9-(2-carboxycyclopropylmethylidene) - 2 - methoxythioxanthene is converted to the mixed anhydride via reaction with ethyl chloroformate and then condensed with dimethylamine to give the amide which is reduced with lithium aluminum hydride to give the product, 9-[2-(N,N-dimethylaminomethyl)-cyclopropylmethylidene] - 2 - methoxythioxanthene.

Similarly, use of 9-(2 - carboxycyclopropylmethylidene) - 2-methoxyanthene or 9 - (2-carboxycyclopropylmethylidene) - 2-chloroxanthene as described above results in the formation of 9 - [2 - (N,N-dimethylaminomethyl)-cyclopropylmethylidene] - 2,2 - methoxyanthene or 9-[2-(N,N-dimethylaminomethyl) - cyclopropylmethylidene] - 2-chloroxanthene, respectively.

EXAMPLE 5

Following the procedures of Example 1, 2 or 3, 9-(2-carboxycyclopropylmethylidene) - 2 - trifluoromethylthioxanthene is converted to the mixed anhydride via reaction with ethyl chloroformate and then condensed with ammonia, N-ethylamine or piperidine to give corresponding amides which are reduced with lithium aluminum hydride to give the respective products, 9-[2-(aminomethyl)-cyclopropylmethylidene] - 2 - trifluoromethylthioxanthene, 9 - [2 - (N-ethylaminomethyl)-cyclopropylmethylidene] - 2-trifluoromethylthioxanthene or 9 - [2 - (N-piperidinylmethyl)-cyclopropylmethylidene]-2-trifluoromethylthioxanthene.

What is claimed is:

1. A chemical compound of the formula:

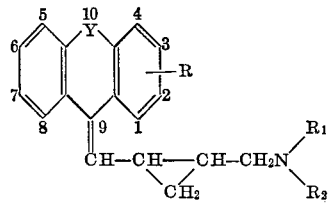

or a pharmaceutically acceptable acid addition salt thereof, wherein:

Y is oxygen or sulfur;

R is hydrogen, chlorine, trifluoromethyl, methoxy or methylmercapto; and $R_1$ and $R_2$ each are hydrogen, lower alkyl of from 1 to 3 carbon atoms or, when taken together with the nitrogen atom to which they are attached, are a pyrrolidine, piperidine, N'-methylpiperazine, N'-(β-hydroxyethyl) - piperazine or N'-(β-acetoxyethyl)-piperazine ring.

2. A chemical compound according to claim 1 in which Y is sulfur.

3. A chemical compound according to claim 2 in which R is in the 2-position.

4. A chemical compound according to claim 3 in which $R_1$ and $R_2$ are both methyl.

5. A chemical compound according to claim 4 in which R is trifluoromethyl, being the compound 9-[2-(N,N-dimethylaminomethyl) - cyclopropylmethylidene] - 2 - trifluoromethylthioxanthene.

6. A chemical compound of the formula:

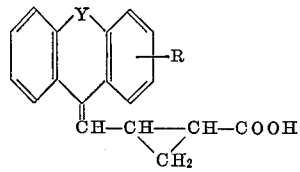

wherein:

Y is oxygen or sulfur; and

R is hydrogen, chlorine, trifluoromethyl, methoxy or methylmercapto.

7. A chemical compound according to claim 6 in which Y is sulfur and R is 2-trifluoromethyl, being the compound, 9-(2-carboxycyclopropylmethylidene) - 2-trifluoromethylthioxanthene.

8. A chemical compound of the formula:

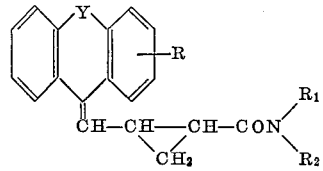

wherein:

Y is oxygen or sulfur;

R is hydrogen, chlorine, trifluoromethyl, methoxy or methylmercapto; and $R_1$ and $R_2$ each are hydrogen, lower alkyl of from 1 to 3 carbon atoms or, when taken together with the nitrogen atom to which they are attached, are a pyrrolidine, piperidine, N'-methylpiperazine or N'-(β-hydroxyethyl)-piperazine ring.

9. A chemical compound according to claim 8 in which Y is sulfur, R is 2-trifluoromethyl and $R_1$ and $R_2$ are both methyl, being the compound 9-[2-(N,N-dimethylcarboxamido)-cyclopropylmethylidene] - 2-trifluoromethylthioxanthene.

References Cited

UNITED STATES PATENTS

| | | | |
|---|---|---|---|
| 2,590,125 | 3/1952 | Robinson et al. | 260—243 |
| 2,629,719 | 2/1953 | Cusic | 260—328 |
| 3,354,155 | 11/1967 | Tretter | 260—240 |
| 3,409,713 | 11/1968 | Kaiser et al. | 260—243 |

JOHN D. RANDOLPH, Primary Examiner

U.S. Cl. X.R.

260—328, 335, 999